United States Patent [19]

Buszard et al.

[11] Patent Number: 4,565,833
[45] Date of Patent: Jan. 21, 1986

[54] FIRE RETARDANT COMPOSITION

[75] Inventors: David L. Buszard, Woodford; Richard J. Dellar, Altrincham, both of England

[73] Assignee: Ciba-Geigy AG, Basel, Switzerland

[21] Appl. No.: 541,352

[22] Filed: Oct. 12, 1983

[30] Foreign Application Priority Data

Oct. 12, 1982 [GB] United Kingdom ................ 8229075

[51] Int. Cl.$^4$ ........................... C08K 5/52; C08K 5/53; C08G 18/08
[52] U.S. Cl. .................................... 521/107; 524/130; 524/141; 524/143; 528/65; 528/72; 252/609
[58] Field of Search ................ 521/107; 524/130, 141, 524/143; 528/51, 65, 72; 252/609

[56] References Cited

U.S. PATENT DOCUMENTS

| | | | |
|---|---|---|---|
| 3,400,085 | 9/1968 | Kujawa et al. | 521/107 |
| 4,165,411 | 8/1979 | Marans et al. | 521/107 |
| 4,407,981 | 10/1983 | Aaronson | 524/130 |
| 4,409,341 | 10/1983 | Hira et al. | 521/107 |

FOREIGN PATENT DOCUMENTS

| | | |
|---|---|---|
| 1569428 | 2/1970 | Fed. Rep. of Germany . |
| 2452357 | 5/1975 | Fed. Rep. of Germany . |
| 2610180 | 9/1977 | Fed. Rep. of Germany . |
| 1146173 | 3/1969 | United Kingdom . |

Primary Examiner—John Kight
Assistant Examiner—Kriellion Morgan
Attorney, Agent, or Firm—Wenderoth, Lind & Ponack

[57] ABSTRACT

A fire retardant composition for rigid polyurethanes or polyisocyanurates comprises dimethyl methyl phosphonate, diethyl ethyl phosphonate or a mixture thereof and a triaryl phosphate, a trialkyl phosphate or an alkyl-/aryl phosphate in a ratio by weight of 5:95 to 95:5. The composition may also contain a halogen-containing flame retardant compound.

15 Claims, No Drawings

FIRE RETARDANT COMPOSITION

The present invention relates to a fire retardant composition for use in rigid polyurethanes and polyisocyanurates, or blends thereof.

Polyurethanes are usually made more fire retardant by adding a phosphorus-containing compound a halogen-containing compound or a mixture thereof to the reactants used for making the polyurethane. One commonly used phosphorus-containing compound is dimethylmethyl phosphonate(DMMP). However, when used alone, in polyurethane foams, DMMP gives rise to various processing problems causing voids, splitting and distortion of the foam. To avoid such problems, or at least to lessen them, the amount of DMMP used is normally limited to about 3% of the weight of the foam. Another alternative which has been proposed (U.S. Pat. No. 3,509,076) is to replace some of the DMMP and the polyol by a reactive phosphorus compound having at least two active hydrogen atoms per molecule such as oxyalkylated dialkyl pyrophosphoric acid.

DMMP is normally produced by an Arbuzov rearrangement reaction on trimethyl phosphite in the presence of a catalyst such as methyl iodide, followed by fractional distillation to separate it from unchanged trimethyl phosphite. In order for DUMP to be free from the disagreeable odour of trimethyl phosphite, the level of trimethyl phosphite in the distilled DMMP must be less than 1 ppm. To achieve this requires careful purification.

Another compound which can be used instead of DMMP is the ethyl analogue, diethyl ethyl phosphonate (DEEP). This is made by a similar process to that used for making DMMP and it too has a smell caused by the presence of triethyl phosphite.

If a mixture of methanol and ethanol is used in the process, the resulting product is a mixture containing DMMP, DEEP together with some diethyl methyl phosphonate and dimethyl ethyl phosphonate. Such a mixture will also contain small amounts of trimethyl phosphite and triethyl phosphite, and may also be used in the present invention. It will be understood that references to a mixture of DMMP and DEEP also includes mixtures which contain diethyl methyl phosphonate and dimethyl ethyl phosphonate.

We have developed a composition which overcomes or minimises the problems associated with the use of DMMP alone, uses a neutral non-reactive co-component and also enables crude phosphonates containing trimethyl phosphite and/or triethyl phosphite in amounts of up to about 2% to be used.

Accordingly the present invention provides a fire retardant composition for rigid polyurethanes or polyisocyanurates which comprises dimethyl methyl phosphonate diethyl ethyl phosphonate or a mixture thereof and a triaryl phosphate, a trialkyl phosphate or an aryl/alkyl phosphate in a ratio by weight of 95:5 to 5:95.

Preferably the ratio of phosphonate to phosphate is from 10:90 to 40:60.

Aryl groups in the triaryl phosphates and alkyl/aryl phosphates may be phenyl or phenyl substituted by one or more alkyl groups having up to about 9 carbon atoms such as phenyl, cresyl, xylyl, isopropylphenyl, t-butylphenyl, and nonylphenyl groups.

Alkyl groups in the trialkyl phosphates and alkyl/aryl phosphates may be straight or branched chain and have up to about 12 carbon atoms such as methyl, ethyl, butyl, octyl, isodecyl and dodecyl.

The phosphates used in the compositions of the invention may be those known for use as flame retardants in polyurethanes such as trimethyl phosphate, triethyl phosphate, tributyl phosphate, trioctyl phosphate, tricresyl phosphate, trixylyl phosphate, the alkylated phenyl phosphates described in British Patent Specification No. 1146173 and diphenyl alkyl phosphates such as diphenyl isodecyl phosphate, and octyl diphenyl phosphate.

Preferably the phosphates used are triaryl phosphates.

The methods of production of phosphate esters are diverse but all rely on the same type of process. One process for producing phosphate esters is claimed in British Patent Specification No. 1,146,173. This comprises contacting phenol with an alkylating agent containing two to sixteen carbon atoms per molecule, and contacting the alkylated phenol product with a phosphorylating agent to produce a triaryl phosphate ester or a mixture of two or more such esters, the proportion of alkylating agent being within the range of from 5% to 65% by weight based on the weight of the phenol with which it is contacted.

Alkyldiaryl phosphates may be prepared by reacting 2 molar proportions of phenol with 1 molar proportion of phosphorus oxychloride in the presence of an aluminium chloride catalyst and afterwards reacting with an alcohol.

We have surprisingly found that if the phosphates, made by processes such as those just outlined, and which are not 100% pure, are admixed with a phosphonate or mixture of phosphonates containing some trimethyl phosphite and/or triethyl phosphite, the trimethyl phosphite and/or triethyl phosphite is decomposed and its smell disappears. This obviates the need for fractional distillation of the phosphonate.

The deodorisation usually occurs within 48 hours, the actual time depending on the amount of trimethyl phosphite present, the amount of phosphate used and the temperature. The time needed can be as little as 12 hours. Any temperature up to the boiling point of the phosphonate may be used and the ratio of phosphonate to phosphate may be as given above.

The deodorisation may take place in glass, plastic or metal containers both in the presence or absence of light or air. The compositions of the present invention are odourless, colourless liquids which are easily soluble in conventional polyols used in the production of polyurethanes and polyisocyanurates.

The compositions of the invention may also contain other flame retardant compounds, especially halogen-containing compounds, such as aliphatic and aromatic bromine-containing compounds or chloroalkyl phosphates. Examples of suitable compounds are pentabromodiphenyl ether, dibromocresyl glycidyl ether (usually obtained in the form of an isomer mixture), tetrabromo bisphenol A, di-bromo neopentyl glycol and tris(monochloro propy-)phosphate.

The amount of other flame retardant additive may vary over a wide range and may be from 3% up to 100% by weight based on the weight of the composition according to the invention. The addition of such additives, especially those containing halogen further improves the flame retardancy of the polyurethane or polyisocyanurate as shown by the Oxygen Index and radiant heat test BS 476 part 7.

Polyurethanes and polyisocyanurates are made by the reaction of a polyol with a polyisocyanate, in the presence of a blowing agent if a foam is desired. The amount of polyisocyanate is varied to produce the desired product. The present invention is applicable to the whole range of polymers having an isocyanate index of from 1 to 2, preferably from 1 to 1.5 e.g. from 1.2 to 1.4.

The incorporation of the compositions of the invention into the polyurethanes or polyisocyanurates is effected by their addition to the precursors before or during the formation of the polymers. Preferably, the flame retardant composition is mixed with the constituent containing hydroxyl groups (polyester or polyether polyol) before its reaction with the polyisocyanate constituent.

The flame retardant compositions do not appreciably affect the rate of foam formation and of curing, therefore foaming operations can be performed on standard conventional equipment. The physical properties of the foam are little changed by the addition of these flame retardant compositions.

Accordingly the invention also provides a method for preparing a polyurethane or polyisocyanurate by reaction of a polyol with a polyisocyanate optionally in the presence of a blowing agent which comprises adding to a reactant or to the reaction mixture a fire retardant composition comprising dimethyl methyl phosphonate, diethyl ethyl phosphonate or a mixture thereof and a triaryl phosphate, a trialkyl phosphate or aryl/alkyl phosphate in a ratio by weight of 5:95 to 95:5, preferably from 10:90 to 40:60.

The amount of fire retardant composition used may be from 5 to 40 parts, preferably 10 to 30 parts by weight, per 100 parts of polymer.

The isocyanates and polyols used in making the polyurethane or polyisocyanurate can be any of those known in the art.

The isocyanate is preferably a liquid such as toluene di-isocyanate and methylene diphenyl di-isocyanate, hydrogenated methylene diphenyl di-isocyanate hexamethylene di-isocyanate and isophorone di-isocyanate.

The polyol may be a polyfunctional active hydrogen compound derived from the reaction of a polyhydroxylic compound such as glycerol, sucrose, sorbitol, triethanolamine, or an amine such as ethylenediamine polyaromatic amine, or an aromatic Mannich base with propylene and/or ethylene oxide.

The reaction between the isocyanate and polyol is normally carried out in the presence of a catalyst, a surfactant and optionally a blowing agent.

Suitable catalysts are basic catalysts such as sodium hydroxide, sodium acetate, tertiary amines or materials which generate tertiary amines such as trimethylamine, triethylene diamine, N-methyl morpholine, N,N-dimethyl cyclohexylamine, and N,N-dimethyl aminoethanol. Other catalysts are metal compounds such as dibutyl tin dilaurate, stannous octoate, and potassium octoate; 2,4,6-tris(N,N-dimethylamino methyl)phenol and 1,3,5-tris(N,N-dimethyl-3-amino propyl)-5-hexahydrotriazine.

The use of surfactants in small quantities, helps to emulsify the polyol, water and isocyanate, provides better dispersion of the catalyst and blowing agent, and assists in the formation of bubbles and stabilises them during foam formation. Suitable surfactants are polydimethylsiloxane or polydimethylsiloxane polyalkylene copolymers.

Suitable blowing agents are inert, low-boiling liquids and include halogenated hydrocarbons such as dichlorodifluoromethane, trichlorofluoromethane, methylene chloride, and hydrocarbons. Alternatively the blowing agent may be derived wholly or partially by chemical reactions which occur during the foaming process such as by the addition of water which reacts with the polyisocyanate liberating carbon dioxide.

The compositions of the invention avoid the problems associated with the use of DMMP alone i.e. the formation of voids, splitting and distortion e.g. warping. The phosphate enables DMMP to be used at higher levels without these problems occurring.

When certain Mannich base amine polyols are used to make polyurethane, scorch can sometimes occur. This scorching tendency is reduced when the compositions of the invention are used.

Other advantages obtained by using the compositions of the invention are improved flow properties of the foaming mix before gelation, improved surface effects in spray systems and the ability to produce higher rise block foam.

The invention is illustrated by the following examples, in which parts and percentages are by weight.

EXAMPLE 1

10 Parts of crude dimethyl methyl phosphonate (DMMP) containing 1% trimethyl phosphite were added to 90 parts of isopropylated phenyl phosphate made as described in British Patent Specification No. 1146173 and having a phosphorus content of 8.4%. After standing in a glass bottle at ambient temperature for 12-24 hours, no odour of trimethyl phosphite was detectable.

EXAMPLE 2

Example 1 was repeated except that the mixture was held at 70° C. The mixture became odour free before 12 hours had expired.

EXAMPLE 3

In a similar manner to Example 1, 20 parts of the same crude DMMP in 80 parts of the phosphate took 36-42 hours to deodorise at ambient temperature.

EXAMPLE 4

A mixture of 40 parts of the crude DMMP used in Example 1 and 60 parts of the phosphate was heated at 70° C. and became free from trimethyl phosphite within 12-20 hours.

EXAMPLE 5

90 Parts of DMMP containing 500 ppm of trimethyl phosphite were added to 10 parts of the phosphate of Example 1. After standing at ambient temperature the mixture was completely deodorised within 24 hours.

EXAMPLE 6

Example 5 was repeated using DMMP containing 1000 ppm trimethyl phosphite. The mixture became odourless between 24 and 48 hours.

EXAMPLE 7

Example 6 was repeated except that the mixture was heated at 70° C. Complete deodorisation occurred within 20 hours.

EXAMPLES 8-11

Example 1 was repeated except that the phosphate was replaced by the esters listed in the Table, each being a normal commercial grade.

| Example | Phosphate Ester | Approx. time for de-odor- isation hrs. | Temperature °C. |
|---|---|---|---|
| 8 | Tricresyl phosphate | 48 | 23 |
| 9 | Trimethyl phosphate | 48 | 23 |
| 10 | Trixylyl phosphate | 24 | 70 |
| 11 | Diphenyl isodecyl phosphate | 24 | 70 |

EXAMPLES 12-17

Foamed polyurethane compositions were prepared using the following composition to give a foam density of $30\pm1$ $Kg/m_3$.

| | |
|---|---|
| Propylan RF 132[1] | 100 |
| Dimethyl cyclohexylamine | 1.8 |
| α-methyl styrene | 0.2 |
| Dabco 33LV[2] | 0.1 |
| Silicone surfactant | 2.0 |
| trichlorofluoromethane | 33 |
| Flame retardant | as indicated |
| Isocon M[3] | 126.9 |

[1]A sucrose propylene oxide condensate polyol-Propylan is a Trade Mark
[2]A tertiary amine catalyst - Dabco is a Trade Mark
[3]A polymeric diphenyl methane diisocyanate - Isocon is a Trade Mark The above ingredients were mixed together in a high speed stirrer (2000 rpm) at room temperature, with the isocyanate being added last and then poured immediately into a cardboard mould. The exothermic reaction which ensued was allowed to free rise the foam. The length of time from the addition of the isocyanate to the formation of a creamy consistency of the mixture is given as the cream time. The time required for the foam to attain the maximum height is given as the rise time. The time until the form is no longer tacky is designated as the non-tack time. After attainment of the non-tack time, the foam is aged for 3 days at ambient temperature.

Test specimens were cut from the foam after 3 days storage and subjected to the limiting Oxygen Index Test and BS 4735 Horizontal Burn test. Results are shown below, and as a comparison the same foam material has been produced without flame retardant.

| Example | 12 | 13 | 14 | 15 | 16 | 17 | |
|---|---|---|---|---|---|---|---|
| Product of Example | | 1 | | | 4 | | |
| Level of product | 5 | 10 | 20 | 5 | 10 | 20 | None |
| Cream time secs | | | 29 | | | 32 | 30 |
| Rise time secs | | | 120 | | | 100 | 110 |
| Non-tack time secs | | | 240 | | | 225 | 240 |
| Oxygen Index % | <21 | <21 | 21.8 | <21 | 21.6 | 22.4 | <21 |
| Burn length in BS 4735 test, mm | 95 | 34 | 17 | 45 | 20 | 10 | burns |
| Burning velocity mm/sec. | 1.39 | 0.8 | 0.37 | 0.81 | 0.29 | 0.18 | |

The foams obtained from Examples 12-17 exhibited no splits and no distortion.

EXAMPLES 18-22

Foamed polyurethane compositions were prepared as described in Examples 12-17 except that the composition used was:

| | |
|---|---|
| Propylan RF 176[4] | 100 |
| Water | 0.2 |
| Silicone surfactant | 2 |
| trichloro fluoro methane | 40 |
| Flame retardant | as indicated |
| Isocon M | 112.8 |

[4]An aromatic polyol

Specimens from these foams were cut and tested for Limiting Oxygen Index and performance in the DIN 4102 B2 vertical burn test. The results are shown in the following table and are compared with the same foam material prepared without a flame retardant.

| Example | 18 | 19 | 20 | 21 | 22 | |
|---|---|---|---|---|---|---|
| Product of Example | 1 | | | | 4 | |
| Level of product | 30 | 10 | 15 | 20 | 30 | None |
| Cream time secs | | | | | 19 | 17 |
| Rise time secs | | | | | 78 | 70 |
| Non-tack time | | | | | 153 | 120 |
| Oxygen index % | 23.72 | 23.2 | 24.2 | 24.8 | 25.1 | <21 |
| Flame height in DIN 4102 B2 test, cms | 13 | 18 | 9 | 8 | 6 | burns |

The foams obtained from Examples 18-22 exhibited no splits and no distortion.

EXAMPLES 23-28

Foamed polyurethane compositions were prepared as described in Examples 12-17 using the following composition and giving a foam density of $36\pm1$ $Kg/m^3$:

| | |
|---|---|
| Propylan RF 176 | 100 |
| Water | 1.1 |
| Polyurax SR 242[5] | 2.2 |
| trichloro fluoro methane | 35 |
| Flame retardant | as indicated |
| Isocon M | 134.7 |

[5]a surfactant

Specimens from these foams were cut and tested for Limiting Oxygen Index. The results are shown in the following Table.

| Example | Flame Retardant | Amount | Oxygen Index |
|---|---|---|---|
| 23 | Product of Example 4 | 40 | 24.6 |
| 24 | Product of Example 4 | 37 | 25.5 |
| | Pentabromo diphenyl ether | 3 | |
| 25 | Product of Example 4 | 40 | 26.5 |
| | Pentabromo diphenyl ether | 10 | |
| 26 | Product of Example 4 | 26 | 25.1 |
| | Pentabromo diphenyl ether | 14 | |
| 27 | Product of Example 4 | 26 | 25.0 |
| | Tetrabromo bisphenol A | 14 | 25.0 |
| 28 | Product of Example 4 | 20 | 27 |
| | Dibromo cresyl glycidyl ether | 20 | |

Foams obtained from Examples 23-28 exhibited no splits and no distortion.

EXAMPLE 29

Foamed polyurethane compositions are prepared as described in Examples 12-17 except that the flame retardant used is

| Product of Example 4 | 10 parts |
|---|---|
| Dibromoneopentyl glycol | 10 parts |

The product had an Oxygen Index of 23.1%, and exhibited no splits and no distortion.

EXAMPLE 30-31

Foamed polyurethane compositions are prepared as described in Examples 18-22 except that the flame retardant used is:

EXAMPLE 30

| Product of Example 4 | 13 parts |
|---|---|
| Hexabomocyclododecane | 7 parts |
| Oxygen Index 24.2% | |

EXAMPLE 31

| Product of Example 4 | 10 parts |
|---|---|
| Dibromoneopentyl glycol | 10 parts |
| Oxygen Index 24.9% | |

The foams obtained from Examples 30 and 31 exhibited no splits and no distortion.

We claim:

1. A fire retardant composition for rigid polyurethanes or polyisocyanurates which comprises (a) dimethyl methyl phosphonate, diethyl ethyl phosphonate or a mixture thereof, and (b) a triaryl phosphate, a trialkyl phosphate or an alkyl/aryl phosphate in a ratio of (a):(b) by weight of 5:95 to 95:5.

2. A process for preparing a composition as claimed in claim 1 which comprises mixing in the required amounts
   (a) dimethyl methyl phosphonate, diethyl ethyl phosphonate or a mixture thereof, and
   (b) a triaryl phosphate, a trialkyl phosphate or alkyl-/aryl phosphate and if necessary maintaining the mixture at a temperature below its boiling point for sufficient time to remove any odour of trimethyl phosphite and/or triethyl phosphite.

3. A composition as claimed in claim 1 in which the ratio of phosphonate to phosphate is from 10:90 to 40:60.

4. A composition as claimed in claim 1 in which the aryl groups in the triaryl or alkyl/aryl phosphates are phenyl or phenyl substituted by one or more alkyl groups having up to 9 carbon atoms.

5. A composition as claimed in claim 1 in which the alkyl groups in the trialkyl phosphates or alkyl/aryl phosphates are straight or branched chained and have up to 12 carbon atoms.

6. A composition as claimed in claim 1 in which the phosphate is a triaryl phosphate.

7. A composition as claimed in claim 1 which also contains another flame retardant containing halogen.

8. A composition as claimed in claim 7 in which the flame retardant containing halogen is an aliphatic or aromatic bromine containing compound or a chloroalkyl phosphate.

9. A composition as claimed in claim 8 which comprises from 3 to 100% by weight of pentabromodiphenyl ether, di-bromo cresyl glycidyl ether, tetrabromo bisphenol A, dibromo neopentyl glycol, or tris monochloropropyl phosphate, based on the weight of composition as claimed in claim 1.

10. A process as claimed in claim 2 in which the mixture is maintained at a temperature from ambient to 70° C.

11. A method as claimed in claim 10 in which the amount of said composition added is from 5 to 40 parts by weight per 100 parts by weight of polymer.

12. A method as claimed in claim 11 in which the amount of said composition added is from 10 to 30 parts by weight per 100 parts by weight of polymer.

13. A method as claimed in claim 12 in which the polymer has an isocyanate index of from 1 to 1.5.

14. In a method of preparing a polyurethane or polyisocyanurate by reacting a polyol with a polyisocyanate, optionally in the presence of a blowing agent, the improvement which comprises adding to a reactant or to the reaction mixture a composition as claimed in claim 1.

15. In a rigid polyurethane or polyisocyanurate polymer prepared by reacting a polyol with a polyisocyanate, optionally in the presence of a blowing agent, the improvement which comprises adding to a reactant or to the reaction mixture in the preparation of the polymer a composition as claimed in claim 1.

* * * * *